Aug. 26, 1947.  A. KALITINSKY ET AL  2,426,310
ENGINE PISTON CONSTRUCTION
Filed Jan. 28, 1944  3 Sheets-Sheet 2

INVENTORS
Andrew Kalitinsky
Walter A. Ledwith

Aug. 26, 1947.   A. KALITINSKY ET AL   2,426,310
ENGINE PISTON CONSTRUCTION
Filed Jan. 28, 1944   3 Sheets-Sheet 3

INVENTORS
Andrew Kalitinsky
Walter A. Ledwith

Patented Aug. 26, 1947

2,426,310

UNITED STATES PATENT OFFICE 2,426,310

ENGINE PISTON CONSTRUCTION

Andrew Kalitinsky, Eagleville, and Walter A. Ledwith, Hartford, Conn., assignors to United Aircraft Corporation, East Hartford, Conn., a corporation of Delaware Application January 28, 1944, Serial No. 520,062

3 Claims. (Cl. 309—10)

Engine pistons generally have a series of piston rings supported between lands on the piston. The concentration of stress at the bases of the grooves between the lands, particularly the bottom groove, may cause failure of the piston at this point. A feature of this invention is a piston so constructed, to avoid this objection, that the lands do not carry any part of the axial loads on the piston.

Another feature is a groove in the outer surface of the piston adjacent the bottom piston ring to form a arrow flange between this groove and the adjacent piston ring groove. The piston, which is a hollow shell, decreases in diameter at a point adjacent to the groove and the groove maintains a uniform wall thickness where the shell diameter decreases.

Since the rate of piston reciprocation in freepiston units is dependent upon the mass of the piston, high speed units require a very light piston. Another feature of this invention is a light weight piston having a load-carrying shell generally of uniform wall thickness with the piston ring lands formed in such a manner that they are not part of the stress carrying structure.

Other objects and advantages will be apparent from the specification and claims and from the accompanying drawings which illustrate an embodiment of the invention.

Figure 1:
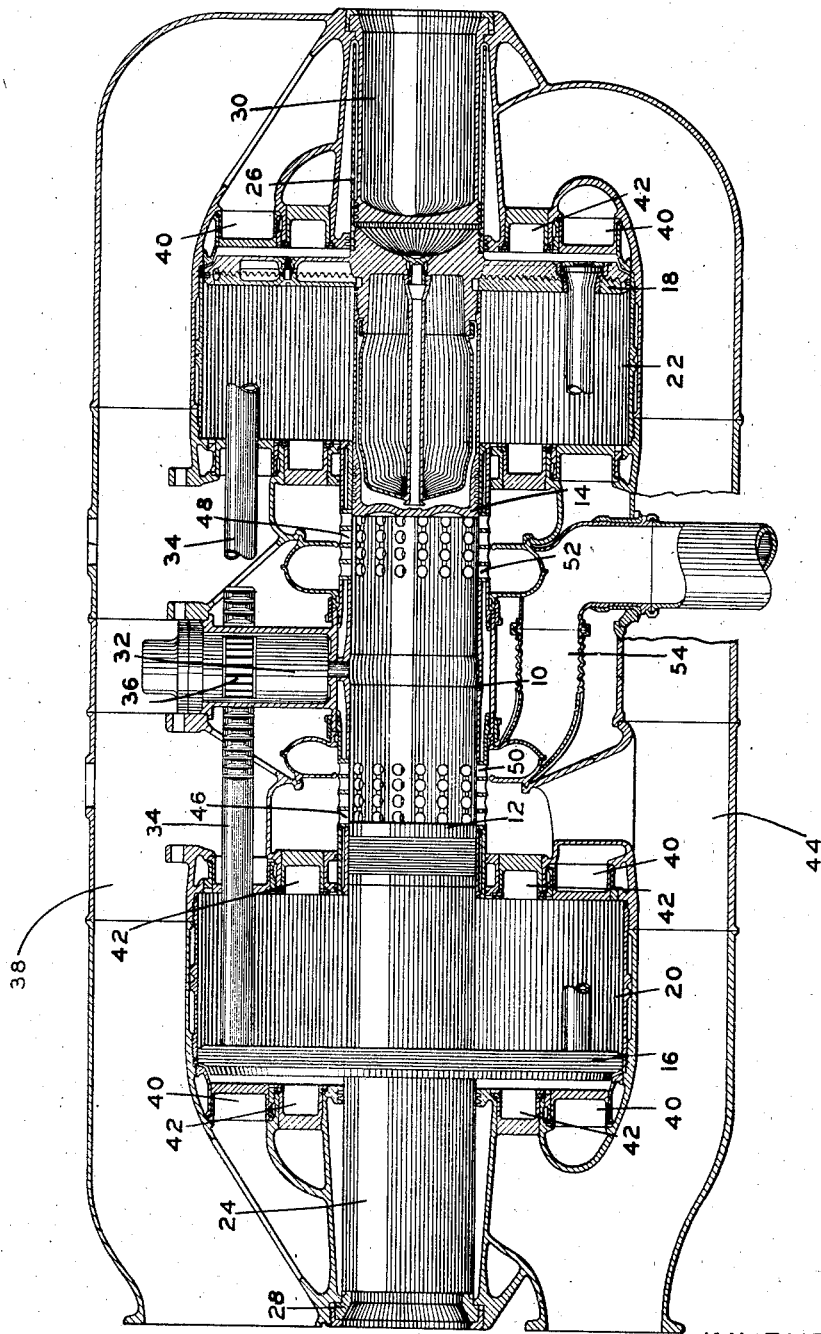
Fig. 1 is a sectional view through a free-piston engine-and-compressor unit.

The unit shown includes an engine cylinder 10 having reciprocating pistons 12 and 14 to which compressor pistons 16 and 18 in cylinders 20 and 22 are integrally connected. Sleeves 24 and 26 attached to the compressor pistons complete the reciprocating piston assemblies. The sleeves in combination with stationary pistons 28 and 30 form air spring cylinders.

The piston assemblies are moved apart by the burning of fuel injected into engine cylinder 10 as by a pump 32. Air compressed in the air spring cylinders on the power stroke returns the piston assemblies. The assemblies are always maintained at equal distances from the center of the engine cylinder by a linkage which may include rack 34 meshing with a piston 36.

Intake manifold 38 conducts air to intake valves 40 through which air alternately enters opposite ends of the compressor cylinders. The compressed air leaves the cylinders through discharge valve 42 also at opposite ends of the compressor cylinders and passes through scavenge manifold 44 through ports 46 and 48 which are uncovered by pistons 12 and 14 at the end of the power stroke, thereby permitting air to be blown through the engine cylinder and exhaust ports 50 and 52 into exhaust manifold 54.

Figure 2:
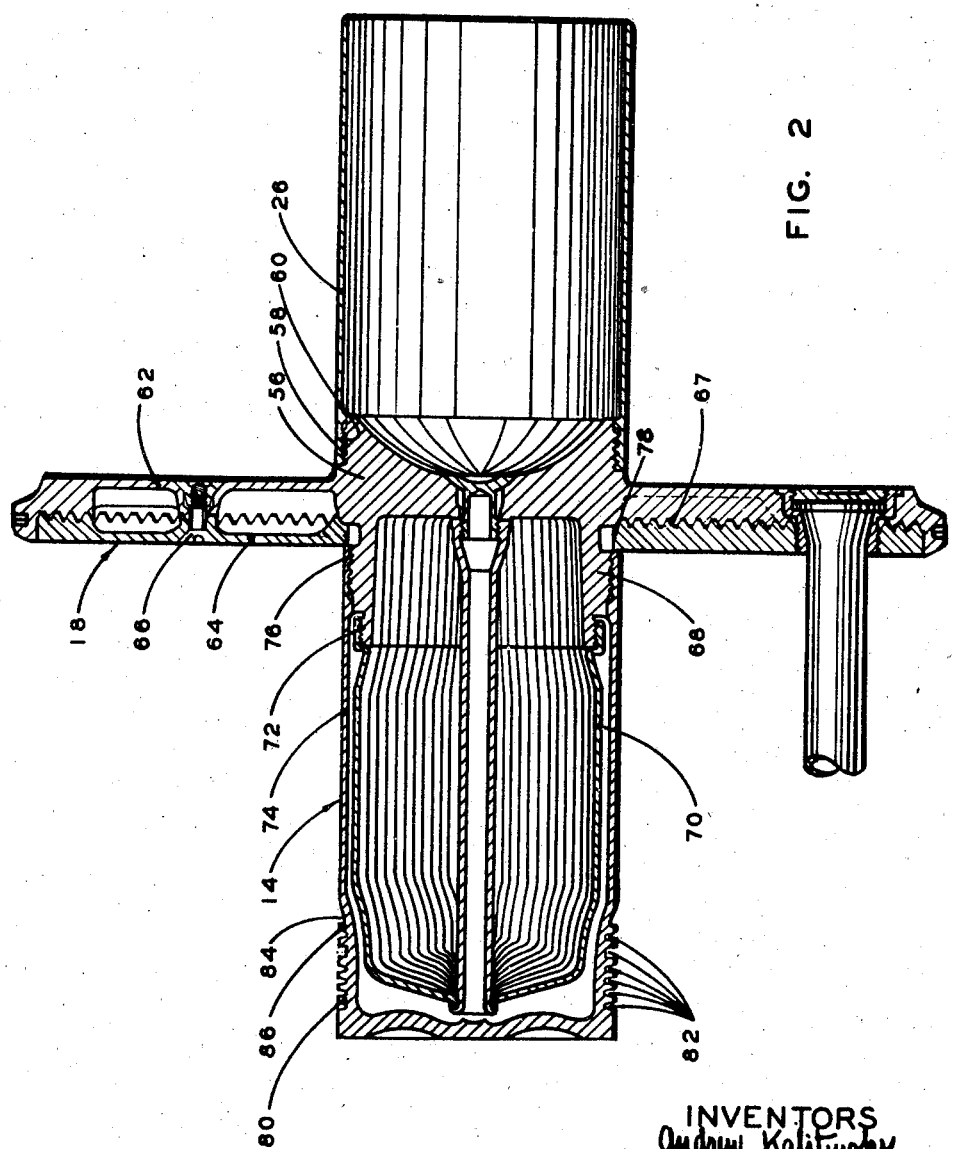
Fig. 2 is a sectional view on a larger scale through one of the pistons.
Figure 3:
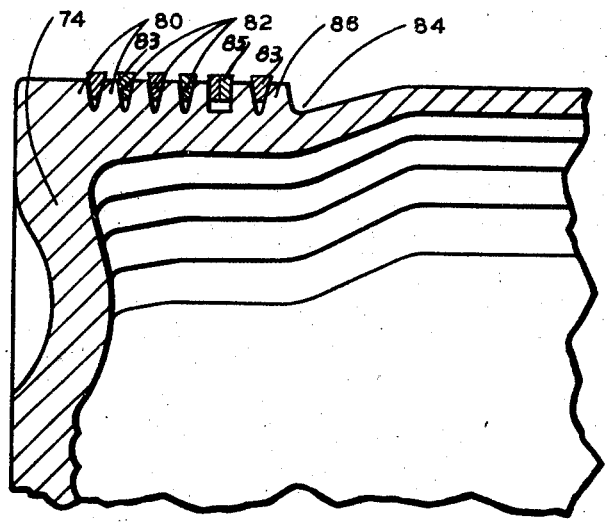
Fig. 3 is an enlarged sectional view of a part of the engine piston.

The piston assembly shown in Fig. 2 includes a base 56 to which the air spring sleeve 26 is fastened as by cooperating threads 58 and 60 on sleeve and base. Base 56 has an integral hub 62 forming one side surface of the compressor piston 18 and a cooperating disc 64 is fastened to disc 62 by bolts 66 to form the other side wall of the compressor piston. The adjoining surfaces of the discs may have interengaging shear serrations 67 to resist bending of the piston.

The base 56 has a projecting hub 63 to the end of which a cup 70 is attached as by cooperating threads 72. This cup is located within and spaced from the hollow shell 74 which forms the engine piston and which is also mounted on hub 68 by cooperating threads 76. The end of shell 74 clamps the inner edge of disc 64 which has a central opening 78 for hub 68.

The cylindrical part of shell 74 has a substantially uniform wall thickness throughout its length. The inner wall of the shell gradually decreases to a smaller diameter adjacent the head of the piston, at this part of the piston, the ring portion of the piston is made up of a number of spaced lands 80 defining, between them, grooves 82 to receive piston rings 83 of well known construction, the convergence of the opposite surfaces of the rings being exaggerated. It will be noted that the unbroken wall thickness of the shell from which lands 80 extend is at least as thick as the wall thickness of the remainder of the cylindrical part of shell.

To assist in maintaining a uniform wall thickness in the shell at the point where it decreases in diameter, a groove 84 is formed adjacent to the lowermost piston ring groove 82.

The wall of this groove remote from the head of the piston is substantially parallel to the sloping inner surface of the shell where it decreases in diameter and forms a substantially uniform wall thickness at this part of the piston. The other wall of this groove is spaced from the adjacent piston ring groove to form a relatively narrow flange or ring 86, which is thin enough axially so that the lines of stress in the shell are not deflected by this flange. The base of this groove 84 is smoothly curved to avoid sharp corners which might cause stress concentrations.

Figure 4:
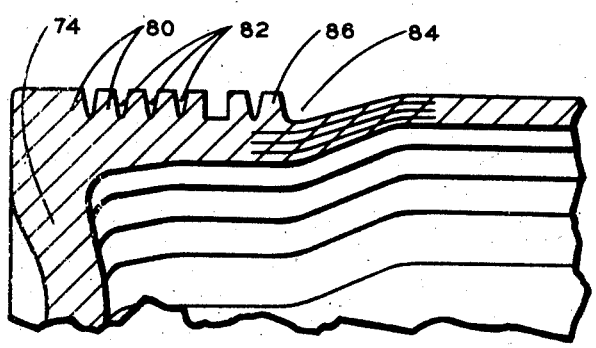
Fig. 4 is a diagrammatic view showing the lines of stress in the piston wall.

The lines of stress are shown in Fig. 4 from which it is apparent that any concentration of stress is avoided and the piston wall is substantially uniformly stressed over its entire thickness.

It is to be understood that the invention is not limited to the specific embodiment herein illustrated and described, but may be used in other ways without departure from its spirit as defined by the following claims.

We claim:

1. A piston for a free-piston unit including a thin wall carrying the axial loads on the piston and an integral substantially thicker portion adjacent the head, said portion having ring receiving grooves therein, said wall gradually decreasing in diameter at the part adjoining the integral portion to form a slanting inner wall surface at this part and a groove in the outer surface of the piston adjacent to the endmost piston ring groove having its wall opposite to the thicker portion substantially parallel to the slanting inner surface of the piston wall and its adjacent wall substantially radial to form a thin flange between said groove and the endmost ring groove.

2. A piston construction for an axially loaded piston including a shell forming the piston wall, said shell gradually increasing in thickness adjacent the part supporting the piston rings in grooves to provide an unbroken wall thickness at the base of the piston ring grooves, at least as thick as the remainder of the shell wall, said shell having another groove adjacent the end piston ring groove to form between said grooves a thin flange which will not affect the axial stress in the shell, the wall of said another groove opposite to the flange sloping away from said flange and substantially parallel to the inner wall surfaces of the piston.

3. A piston construction for an axially loaded piston including a shell forming the piston wall, said shell gradually increasing in thickness adjacent the part supporting the piston rings in grooves to provide an unbroken wall thickness at the base of the piston ring grooves at least as thick as the remainder of the shell wall, said shell having another groove adjacent the end piston ring groove to form between said grooves a thin flange which will not affect the axial stress in the shell, said another groove having its wall opposite to the flange substantially parallel to the inner surface of the shell, where the shell gradually increases in thickness, the base of said another groove being smoothly curved to avoid stress concentration.

ANDREW KALITINSKY.
WALTER A. LEDWITH.

REFERENCES CITED

The following references are of record in the file of this patent:

UNITED STATES PATENTS

| Number | Name | Date |
|---|---|---|
| 1,710,292 | Brush | Apr. 23, 1929 |
| 2,104,892 | Blettner | Jan. 11, 1938 |
| 1,139,396 | Barthel | May 11, 1915 |
| 411,083 | Scheibe | June 8, 1943 |
| 1,668,954 | Faurot | May 8, 1928 |
| 1,726,380 | Blomgren | Aug. 27, 1929 |
| 1,065,289 | Willmer | June 17, 1913 |
| 1,739,007 | Larkin | Dec. 10, 1929 |

FOREIGN PATENTS

| Number | Country | Date |
|---|---|---|
| 233,728 | Great Britain | May 9, 1925 |
| 442,914 | Great Britain | Feb. 8, 1936 |